(12) United States Patent
Bazargan (10) Patent No.: US 6,668,858 B1
(45) Date of Patent: Dec. 30, 2003

(54) CHECK VALVE

(75) Inventor: Afshin Bazargan, Simi Valley, CA (US)

(73) Assignee: Pentair Pool Products, Inc., Sanford, NC (US)

( * ) Notice: Subject to any disclaimer, the term of this patent is extended or adjusted under 35 U.S.C. 154(b) by 0 days.

(21) Appl. No.: 10/282,998

(22) Filed: Oct. 29, 2002

(51) Int. Cl.⁷ .............................................. F16K 27/12
(52) U.S. Cl. ................ 137/559; 137/269.5; 137/527.4; 251/86
(58) Field of Search .................... 137/269.5, 527.4, 137/527, 559; 251/86

(56) References Cited

U.S. PATENT DOCUMENTS

| | | | |
|---|---|---|---|
| 3,378,021 A | * | 4/1968 | Milo .................. 137/527.4 X |
| 3,831,622 A | * | 8/1974 | Grewer et al. ............ 251/86 X |
| 4,248,403 A | * | 2/1981 | Scull ........................ 251/86 X |
| 5,411,056 A | * | 5/1995 | Solaroli .................. 137/527.4 |
| 6,247,489 B1 | | 6/2001 | Maskell et al. |

* cited by examiner

Primary Examiner—Kevin Lee
(74) Attorney, Agent, or Firm—Pearne and Gordon LLP (57) ABSTRACT

A check valve is provided having a valve body and a sealing assembly within the valve body. The sealing assembly is biased, via a biasing force, in a seated position against a valve seat adjacent or surrounding an inlet port of the valve body. The sealing assembly includes an armature that has a proximal end and a distal end, and a sealing member that is pivotally attached to the distal end of the armature at a seal pivot joint. The proximal end of the armature is pivotally attached to the inner wall surface of the valve body at a wall pivot joint. Thus, the armature is a dual-hinged armature, providing at least two degrees of freedom, one translational and one rotational, for the sealing member to be properly seated against the valve seat. Effective sealing is thus achieved despite potentially imperfect alignment between the valve seat and the sealing assembly, and also despite a non-perfectly smooth valve seat.

40 Claims, 4 Drawing Sheets

CHECK VALVE

BACKGROUND OF THE INVENTION

1. Field of the Invention

The present invention relates to a check valve. More particularly, it relates to a check valve having a sealing member connected to a dual-hinged armature.

2. Description of Related Art

Check valves are used to restrict fluid flow (e.g. a liquid or a gas) to only one direction. Selection of an appropriate check valve depends on the working fluid, its physical and chemical characteristics, the piping system, and the operating temperature and pressure as known in the art.

In one type of check valve particularly suitable for water systems, for example water filtration applications, the valve has a valve body with an inlet port and an outlet port, and a sealing member within the valve body that is biased in a normally-closed position to seal the inlet port. U.S. Pat. No. 6,247,489 discloses such a valve, and is incorporated herein by reference. As shown in the '489 patent, the sealing member (flapper 40 in '489) is hinged from the inner surface of the valve cover member, and biased by a spring force against the valve seat surrounding the inlet port to form a seal. This is referred to as the seated or sealed position of the sealing member.

The check valve is installed in a piping system with the inlet port connected to the upstream part of the system, and the outlet port to the downstream part. When the upstream pressure exceeds the downstream pressure, as in normal operation, the upstream fluid pressure is sufficient to overcome the biasing spring force and displace the sealing member (or flapper) from its seated position allowing fluid to enter the valve body. The fluid then exits the valve body through the outlet port unobstructed. Thus, the check valve permits fluid flow in the direction from upstream to downstream (inlet port to outlet port) during ordinary operation; i.e. when upstream pressure exceeds downstream pressure.

However, when the downstream pressure meets or exceeds the upstream pressure, which can occur, e.g., due to an obstruction downstream, the biasing spring force and/or the downstream pressure force the sealing member back into its seated position to prevent back-flow of the fluid.

The above check valve suffers from the drawback that an effective fluid tight seal is often not achieved between the sealing member and the valve seat. This is in part because the sealing member often is not squarely or snugly seated against the valve seat about its entire perimeter. As shown in FIG. 3 of '489, the sealing member is constrained to travel in an arc (shown at C), being hinged from the cover member. Thus, the valve seat must be perfectly aligned with this arc in order to ensure an effective fluid tight seal around the entire perimeter of the valve seat. Unfortunately, such perfect alignment is often not achieved and the result is imperfect seating of the sealing member which leads to an ineffective fluid seal.

In addition, effective sealing is also hampered by the fact that the valve seat often is not very smooth. Smooth surfaces, highly desirable for effective sealing, are difficult to achieve in a cost-effective manner for the inner wall surface of a round valve body. Round valve bodies are preferred due to their fluid dynamic properties, pressure strength and other reasons.

Thus, even when the check valve is closed, an undesirable amount of fluid often can leak past the sealing member and out the inlet port into the piping system upstream of the check valve.

Accordingly, there is a need in the art for a check valve of the type described above, but which overcomes the mentioned drawbacks and effectively reduces or substantially eliminates undesirable back-flow of fluid when the sealing member is in the seated position.

SUMMARY OF THE INVENTION

A check valve is provided having a valve body and a sealing assembly provided within the valve body. The valve body has an inner wall surface, an inlet port, an outlet port and a valve seat adjacent or surrounding the inlet port. The sealing assembly comprising an armature having a proximal end and a distal end, and a sealing member pivotally attached to the distal end of the armature at a seal pivot joint. The proximal end of the armature is pivotally attached to the inner wall surface of the valve body at at least one wall pivot joint. The sealing member is biased, via a biasing force, in a seated position against the valve seat.

Another check valve is also provided. The check valve has a valve body and a sealing assembly within the valve body. The valve body has an inner wall surface, an inlet port, an outlet port and a valve seat adjacent or surrounding the inlet port. The sealing assembly comprises an armature having a proximal end and a distal end, and a sealing member pivotally attached to the distal end of the armature at a seal pivot joint, wherein the sealing member is rotatable about a first rotational axis through the seal pivot joint. The proximal end of the armature is pivotally attached to the inner wall surface of the valve body at at least one wall pivot joint such that the sealing member is translatable along an arcuate path that is substantially aligned with the valve seat. The sealing member is biased, via a biasing force, in a seated position against the valve seat.

Another valve is provided having housing that defines an interior volume and which has at least two flow ports therethrough, and a cover having a sealing assembly pivotally attached thereto. The cover is removably attachable to the housing in a plurality of orientations to selectively orient the sealing assembly adjacent any one of the ports in the housing such that fluid is permitted to flow into the interior volume of the housing through the adjacent port. The sealing assembly prevents fluid from flowing out of the interior volume through the adjacent port. The sealing assembly has an armature pivotally attached to the cover, a biasing member between the cover and the armature, a seal pivot joint, and a sealing member pivotally attached to the diverter at the seal pivot joint. The sealing member has at least one lip that extends around a perimeter of the sealing member and is supported thereby to contact the housing.

DETAILED DESCRIPTION OF THE PREFERRED EMBODIMENTS OF THE INVENTION

Figure 1:
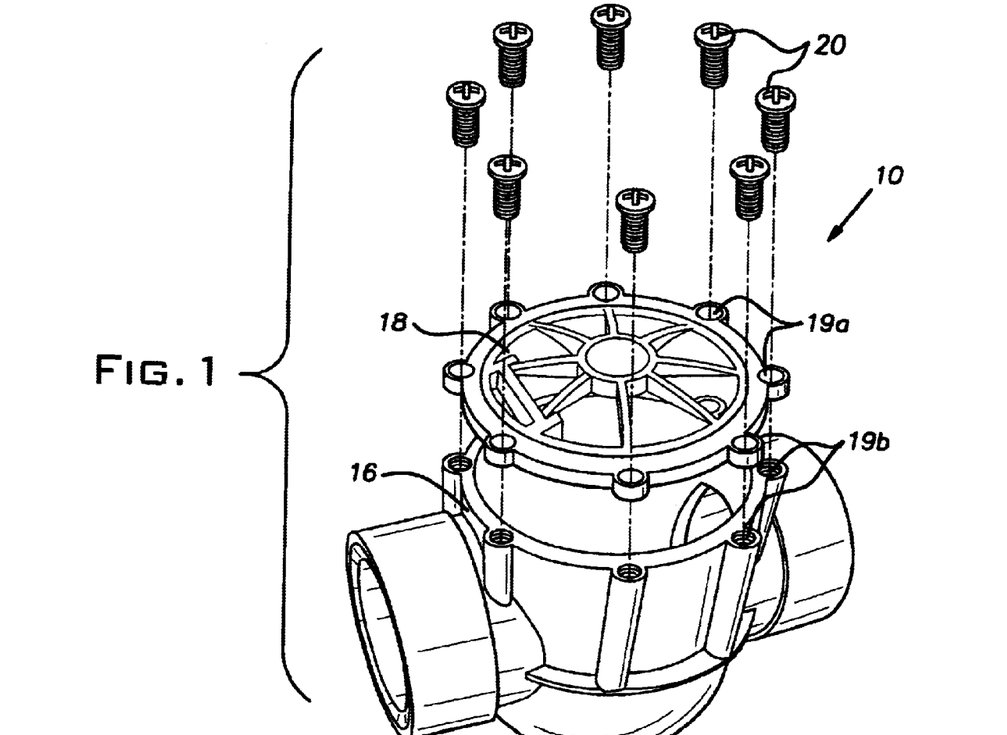
FIG. 1 is a perspective view of a check valve according to the invention, showing the cover member lined up for attachment to the valve body.
Figure 2:
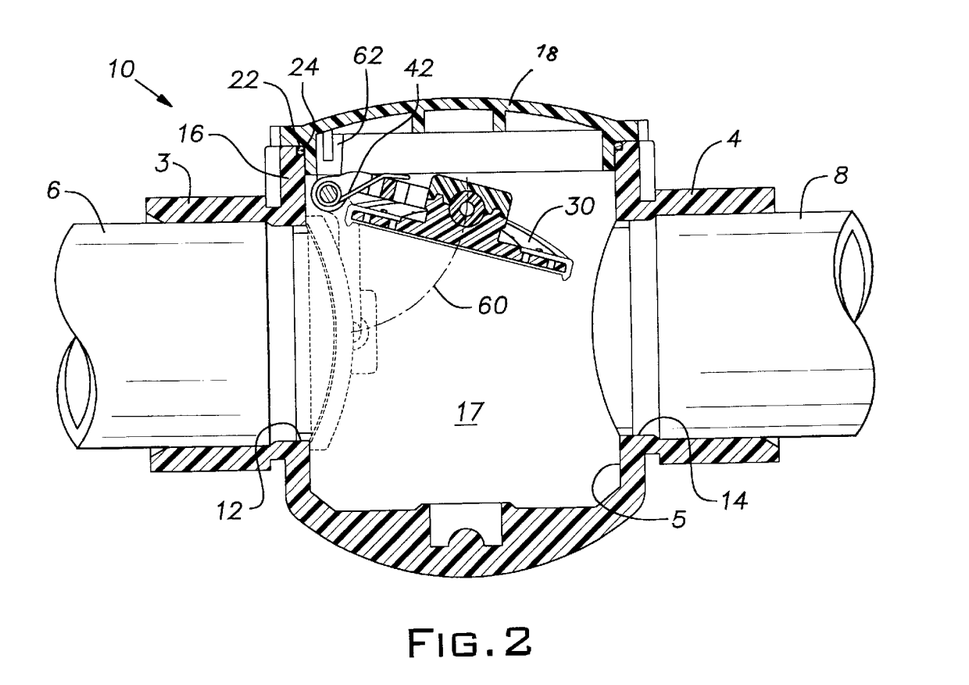
FIG. 2 is a side view, in cross-section, taken along line 2—2 in FIG. 3.
Figure 3:
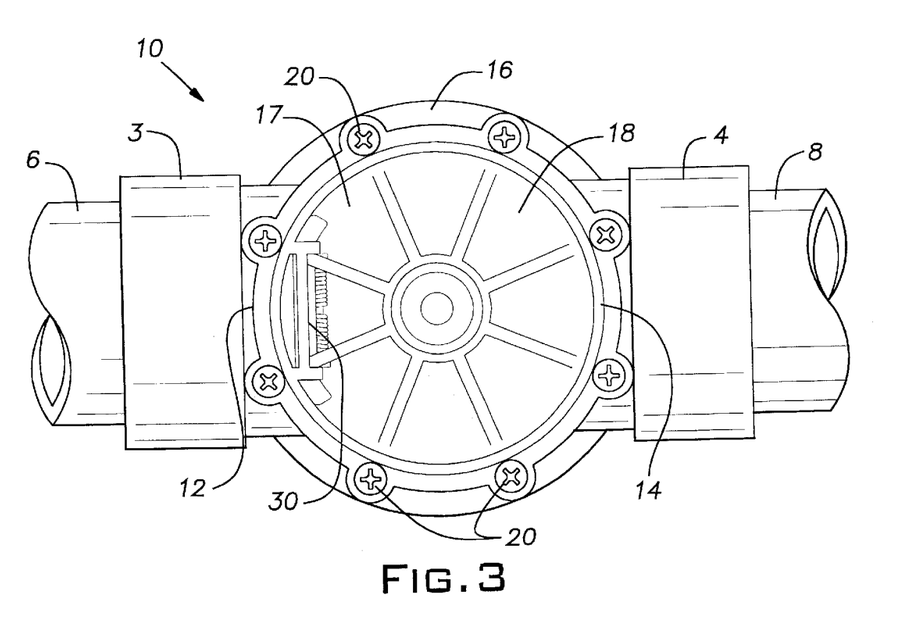
FIG. 3 is a top view of a check valve according to the invention.
Figure 4:
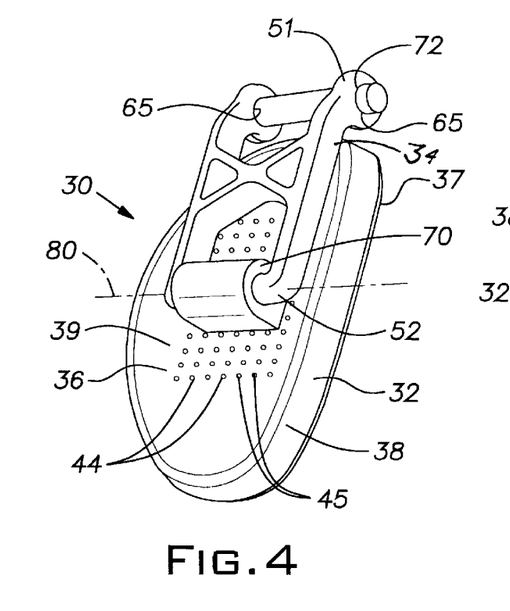
FIG. 4 is a rear perspective view of a sealing assembly for a check valve according to the invention, having a seal pivot joint.

Referring now to the drawings, FIGS. 1–3 shows a check valve 10 according to the invention. The check valve 10 has a valve body 16 and a cover member 18 that is preferably removably attached to the valve body 16. The valve body 16 defines an interior volume 17 therein which is preferably substantially open and unobstructed (except for the sealing assembly 30 described below) to permit the free flow of fluid therethrough. The valve body 16 has an inlet port 12 and an outlet port 14 to permit fluid flow into and out from the valve body 16. The check valve 10 is adapted to be installed in a piping system such that the inlet port 12 is connected to the upstream section 6 of a pipeline and the outlet port 14 is connected to the downstream section 8. The ports can be connected to their respective pipe sections via welding, threaded connections, compression or other fittings, or via any other known or conventional means. Inlet and outlet coupling portions 3 and 4 preferably are provided adjacent inlet and outlet ports 12 and 14 respectively to facilitate such connections as may be desired. The check valve also has a sealing assembly 30 provided within the valve body 16. The sealing assembly 30 is adapted to seal the inlet port 12 in a normally-closed position, but can be displaced by upstream fluid pressure to permit fluid flow into the interior volume 17 of the valve body 16.

Figure 8:
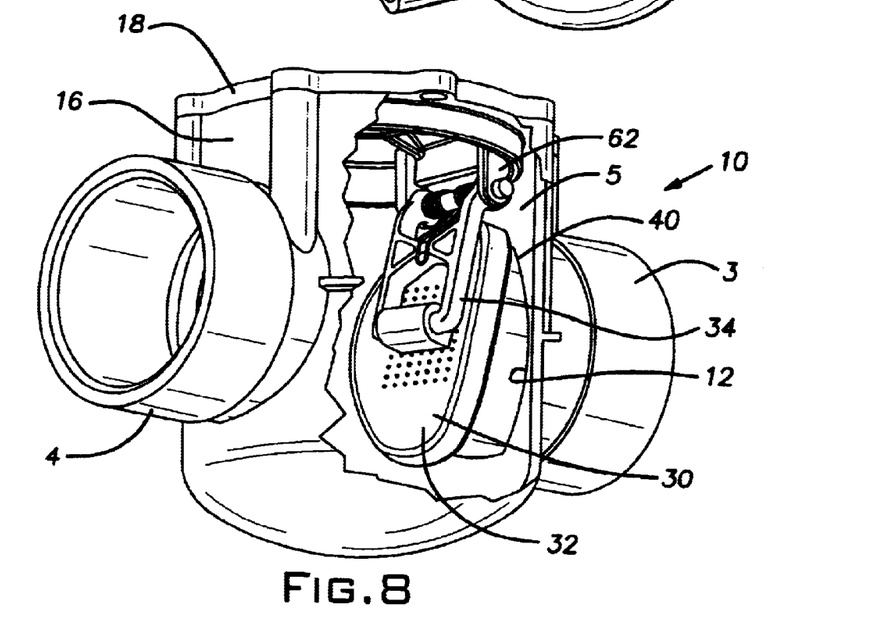
FIG. 8 shows a perspective view of an invented valve with the valve body partially broken away to reveal the sealing assembly and the valve seat therein.

Preferably, the inlet and outlet ports 12 and 14 are coaxially aligned as shown in FIGS. 2–3 so the fluid path through the check valve 10 is substantially straight or linear. Coaxial alignment ensures the pressure drop through the check valve 10 is as low as possible. Alternatively, the inlet and outlet ports 12 and 14 can be axially offset, e.g., at an angle of 30°, 45°, 60°, 90°, or 120°, or any other suitable angle. For example, FIG. 8 shows a top view of an invented check valve 10 where the inlet and outlet ports 12 and 14 are axially offset 90°, forming an "L". It will be understood that the alignment of the inlet and outlet ports 12 and 14 can be selected to accommodate a particular piping system.

The valve body 16 is preferably made from a plastic material such as a thermoset or thermoplastic material as known in the art. Preferably, the valve body 16 is made from PVC or CPVC. Less preferably, the valve body 16 can be made from other plastic or polymeric materials such as polypropylene, polyethylene, ABS plastic, acrylics, etc. Alternatively, the valve body 16 can be made from metal, such as aluminum, steel, copper, brass, or alloys thereof, as well as other metals or metal alloys. The valve body is preferably cast or molded via conventional techniques.

As best seen in FIG. 3, the cover member 18 is preferably made from a clear or transparent or substantially transparent plastic material so that the interior volume 17 of the valve body 16 is visible through the cover member 18 when the check valve 10 is assembled. Clear plastic materials are known in the art; clear acrylics are particularly suited for the cover member 18 due to their high transparence and durability. Less preferably, the cover member 18 can be translucent or opaque, and/or can be made from other conventional materials, including metals and plastics.

As mentioned above, the cover member 18 is preferably removable. This is to permit repairs or servicing of the sealing assembly 30 without having to remove the check valve 10 from its piping installation, as will be further described. The cover member 18 is preferably provided with a plurality of first holes 19a. The first holes 19a are provided so that they line up with a plurality of second holes 19b in the valve body 16 when the cover member 18 is assembled thereto (see FIG. 1). Preferably, at least the second holes 19b are threaded, and threaded fasteners 20 such as screws, bolts or the like, are used to secure the cover member 18 to the valve body 16 via first and second holes 19a. and 19b. As shown in FIGS. 1 and 3, the first and second holes 19a and 19b are preferably provided such that the cover member 18 can be attached and secured to the valve body 16 in multiple rotational positions. That is, cover member 18 can be rotated relative to the valve body 16 until the first holes 19a are realigned with the second holes 19b to permit reattachment of the cover member 18 in a plurality of rotational positions. The importance of this feature will be discussed further below. Preferably, the valve body 16 has a retaining groove 22 to accommodate an O-ring 24 in order to achieve a fluid-tight seal between the valve body 16 and the cover member 18. The O-ring 24 is made from conventional materials selected for compatibility with the working fluid.

Referring to FIGS. 4–7, the sealing assembly 30 includes a sealing member 32 and an armature 34. The sealing member 32 has a surface contour that is complementary to the contour of the valve seat 40 in order to provide an effective fluid tight seal in the seated position. Valve seat 40 refers to the portion or ring of the inner wall surface 5 of the valve body 16 that surrounds the inlet port 12, with which the sealing member 32 forms a fluid-tight seal in the seated position (See FIG. 8); i.e. the sealing member 32 is preferably provided such that it overlaps the inner wall surface 5 of the valve body 16 in a ring surrounding the inlet port 12. Alternatively, the valve seat 40 can be provided as a raised or recessed ring or surface relative to the inner wall surface 5, with or without gaskets, O-rings, or other conventional sealing aids, or in any other conventional manner adapted for sealing engagement with the sealing member 32 in the seated position. The sealing member 32 preferably includes a rigid support member 36 and a resilient elastomeric layer or gasket or covering or sheath 38 provided on or over the rigid support member 36. The elastomeric sheath 38 is made from an elastomeric material, such as natural or synthetic rubber, that facilitates an effective fluid-tight seal with the valve seat 40 when the sealing member 32 is in the seated position. Selection of the particular elastomeric material will depend on factors such as the working fluid, temperature, pressure, etc., and is within the ordinary skill in the art.

The support member 36 provides the underlying structural support for the elastomeric sheath 38. The surface contour of the support member 36 (and therefore of the elastomeric sheath 38) is complementary to the contour of the valve seat 40 to facilitate sealing engagement with the valve seat 40 in the seated position. The sheath 38 is provided at least on the portion of the rigid support member 36 that contacts or engages the valve seat 40 in the seated position; i.e. the sheath 38 is provided at least as an annular ring complementary to the valve seat 40 on the facing surface 37 of the support member 36. Preferably, the sheath 38 covers or ensheaths the facing surface 37. In a preferred embodiment, the sheath 38 can wrap around the edges of the rigid support member 36 and cover at least a portion of the rear surface 39 thereof.

Preferably, The elastomeric sheath 38 is molded over the support member 36 such that the sheath 38 substantially encloses the support member 36 therein. In other words, the support member 36 is preferably essentially a core mold for the sheath 38 which is molded and formed thereover. Preferably, the rigid support member 36 is provided with a plurality of plug holes 44 therein which are filled with elastomeric material during the molding process. This material forms elastomeric plugs 45 that fix the elastomeric sheath 38 in place over the support member 36 and impart stability thereto.

Figure 5:
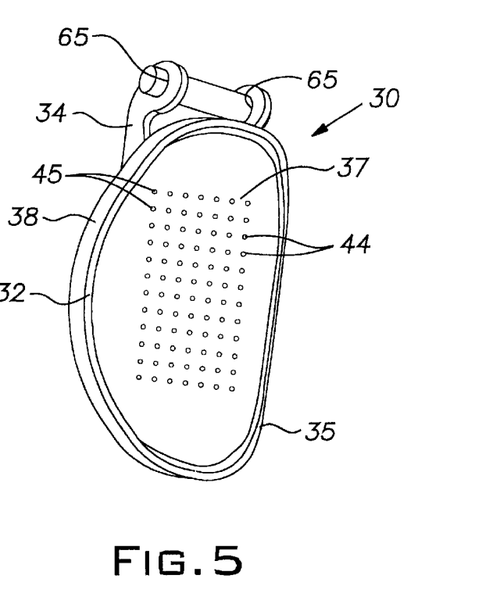
FIG. 5 is a front perspective view of the sealing assembly of FIG. 4.

In order to provide a more effective fluid-tight seal between the elastomeric sheath 38 and the valve seat 40, it may be desirable to provide the sheath 38 with one or more extending annular lips 35 (as shown in FIG. 5) that will engage the valve seat 40 in the seated position of the sealing member 32.

The armature 34 has a proximal end 51 and a distal end 52. Armature 34 is pivotally attached at its distal end 52 to the rear surface 39 of the rigid support member 36 via a seal pivot joint 70. The armature 34 is also pivotally attached at its proximal end 51 to the inner wall surface 5 of the valve body 16 via a wall pivot joint (or joints) 72. The result is a dual-hinged armature as will be apparent from the figures. In the figures, the armature 34 is shown having two pin-receiving bores 65 provided in separate extending portions or arms at the proximal end 51. Corresponding pivot support arms 62 with pin-receiving bores 64 are also provided on the inner wall surface S of the valve body 16, resulting in two wall pivot joints 72 as shown. However, the armature 34 can be provided having only a single pin-receiving bore 65, with corresponding pivot support arms 62 and bores 64 resulting in only one wall pivot joint 72. As used herein, the wall pivot joint 72 will be understood to embrace both of these configurations. Also as used herein and in the claims, unless the context indicates otherwise when the proximal end 51 of the armature 34 is said to be attached (or pivotally attached) to the inner wall surface 5 of the valve body 16 (e.g., via a pivot joint), this shall be understood to embrace attachment to the inner wall surface 5 of the cover member 18, which effectively forms a part of the valve body 16 once it is assembled thereto.

The position of the wall pivot joint 72 is selected so that as the armature 34 pivots therefrom, the entire sealing member 32 travels or translates along an arcuate path 60 (drawn through the center of the sealing member 32) that is substantially aligned with the valve seat 40. By substantially aligned, it is meant that the valve seat 40 and arcuate path 60 are arranged such that in a terminal position of the arcuate path 60 (shown in phantom in FIG. 2), the sealing member 32 is seated against (in sealing engagement with) the valve seat 40. In other words, the terminal position of the sealing member 32 is its seated position. The sealing member 32 is biased in the seated position via a biasing force, preferably supplied by a torsion spring 42 as shown in FIGS. 1–2. Less preferably, the biasing force can be supplied via other suitable or conventional means, e.g., an elastic band, spring clip, etc.

The wall pivot joint 72 can be provided via any suitable or conventional means, for example as described above. Alternatively, other pivotable configurations are also known, and may be suitable for the wall pivot joint 72.

The distal end 52 of the armature 34 is pivotally attached to the sealing member 32 via the seal pivot joint 70 as shown in FIGS. 4–7. Preferably, the seal pivot joint 70 is located proximate the center of the rear surface 39 of the support member 36. The seal pivot joint 70 can be provided similarly as described above with respect to the wall pivot joint(s) 72. Preferably, the seal pivot joint 70 is oriented such that the sealing member 32 can rotate about a first rotational axis 80 that is substantially parallel to the axis of rotation of the armature 34 about the wall pivot joint 72. It will be understood that rotation of the armature about the wall pivot joint 72 results in substantially translational movement of the sealing member 32 along the arcuate path 60. Whereas rotation of the sealing member 32 about the first rotational axis 80 drawn substantially through the seal pivot joint 70 results in rotational movement of the sealing member 32 about that axis. In this manner, the sealing member 32 is not constrained to move only along the arcuate path 60 to provide a complementary seal with the valve seat 40 in the seated position; the sealing member 32 exhibits a second degree of freedom (i.e. rotation about the first rotational axis 80). The result is one degree of translational freedom along arcuate path 60 and one degree of rotational freedom about the seal pivot joint 70. Thus, the valve seat 40 need not be perfectly aligned with the arcuate path 60 to ensure a fluid tight seal between the sealing member 32 and the valve seat, because the sealing member 32 is free to rotate about the first rotational axis 80 until the elastomeric sheath 38 is properly seated; i.e. until substantially continuous, intimate, sealing contact is established between the elastomeric sheath 38 and the valve seat 40 around the entire perimeter.

Figures 6, 7:
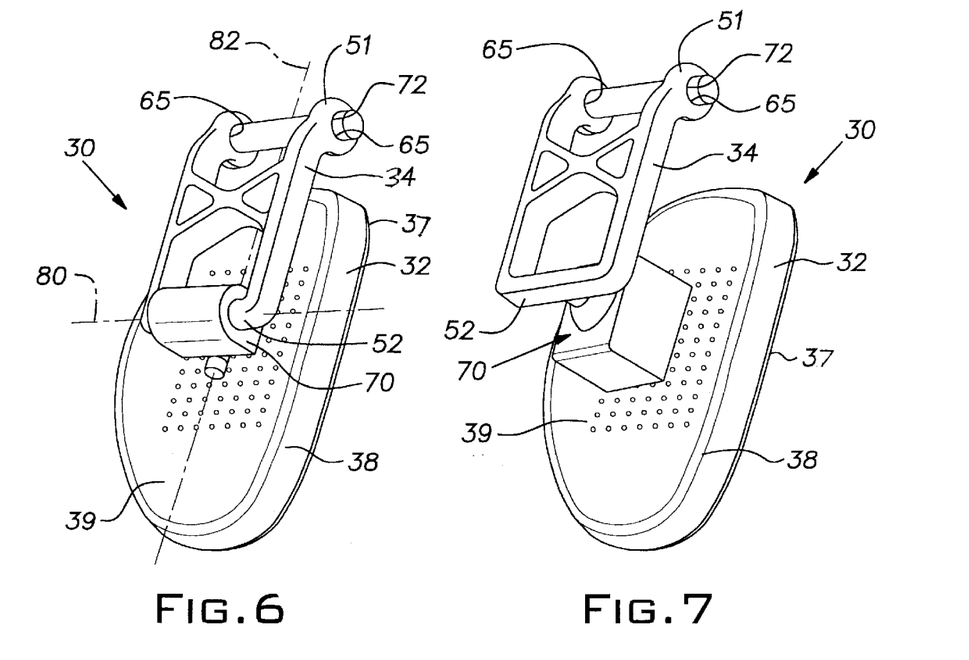
FIG. 6 is a perspective view as in FIG. 4, except the seal pivot joint is a bi-directional pivot joint.
FIG. 7 is a perspective view as in FIG. 4, except the seal pivot joint is a universal joint.

In a preferred embodiment, shown in FIG. 6, the seal pivot joint 70 is provided as a bi-directional pivot joint, that is, allowing rotation of the sealing member 32 about the first rotational axis 80 and also about a second rotational axis 82, perpendicular to the first. In this embodiment, the sealing member 32 exhibits a third degree of freedom; that is, one degree of translational freedom, and two degrees of rotational freedom about the seal pivot joint 70. Here, the sealing member 32 is virtually unconstrained in terms of the geometric orientations about the seal pivot joint 70 to which it can conform in order to properly seat the elastomeric sheath 38 to the valve seat 40.

In a further preferred embodiment, shown in FIG. 7, the seal pivot joint 70 can be provided as a universal joint, such as a ball-and-socket joint as shown in the figure. In this configuration, the orientation of the sealing member 32 about the seal pivot joint 70 is truly unconstrained, resulting in substantially infinite degrees of freedom with respect to rotation about the seal pivot joint 70. Therefore, the sealing member 32 can conform to any necessary orientation about the seal pivot joint 70 in order to properly seat the elastomeric sheath 38.

With the sealing member 32 able to rotate about the seal pivot joint 70, the centrally applied biasing force (applied to the rear surface 39 of the support member 36 via armature 34) is evenly or substantially evenly distributed about the elastomeric sheath 38 that forms the seal with the valve seat 40. This, coupled with the sealing member's ability to conform its orientation to properly seat the sheath 38, results in effective sealing between the sheath 38 and the valve seat 40 even though the valve seat 40 is not completely smooth, and may not be perfectly aligned with the arcuate path 60 as described above.

Most preferably, as shown in the figures, the sealing assembly 30 is attached to the inner wall surface 5 of the cover member 18. That is, the pivot support arms 62 extend from the inner wall surface 5 of the cover member 18 with the armature 34 pivoting therefrom. This embodiment is preferred for the following reasons. Referring again to FIG. 3, a top view of the invented check valve 10 is shown with the sealing assembly 30 attached to and pivoting from the cover member 18. The cover member 18 is rotationally aligned with the valve body 16 so that when they are assembled, the sealing assembly 30 is in the proper rotational position to line up with the inlet port 12 as shown.

In the valve of FIG. 3, fluid is permitted to flow from left to right through the valve, i.e. in the inlet port 12, through interior volume 17 and out the outlet port 14, but not in the reverse direction. However, should it ever become desirable to reverse the flow through the valve, this can be accomplished simply by removing the screws 20, rotating the cover member 18 on the valve body 16 to position the sealing assembly 30 adjacent the outlet port 14, and replacing the screws 20 (see FIG. 1). Now the check valve will permit flow in a right-to-left direction with outlet port 14 in FIG. 3 having become the inlet port and vice versa. Because the cover member 18 is clear, one can easily determine without disassembling the valve which direction fluid will be permitted to flow based on the position of the sealing assembly 30. Furthermore, when the sealing assembly 30 is attached to the cover member, the valve body 16 can be installed in a pipeline without regard to the direction of fluid flow. After the valve body 16 has been installed, the desired flow direction can be ascertained and the cover member 18 attached to the valve body 16 so the sealing assembly 30 is positioned adjacent the appropriate port. Also, when attached to the cover member 18, the sealing assembly 30 can be easily removed, serviced and/or replaced should it or the elastomeric sheath 38 become damaged or worn, without the need to remove the valve body 16 from the pipeline.

Less preferably, the sealing assembly can be attached to the inner wall surface 5 of the valve body 16, i.e. opposite the cover member 18.

Figure 9:
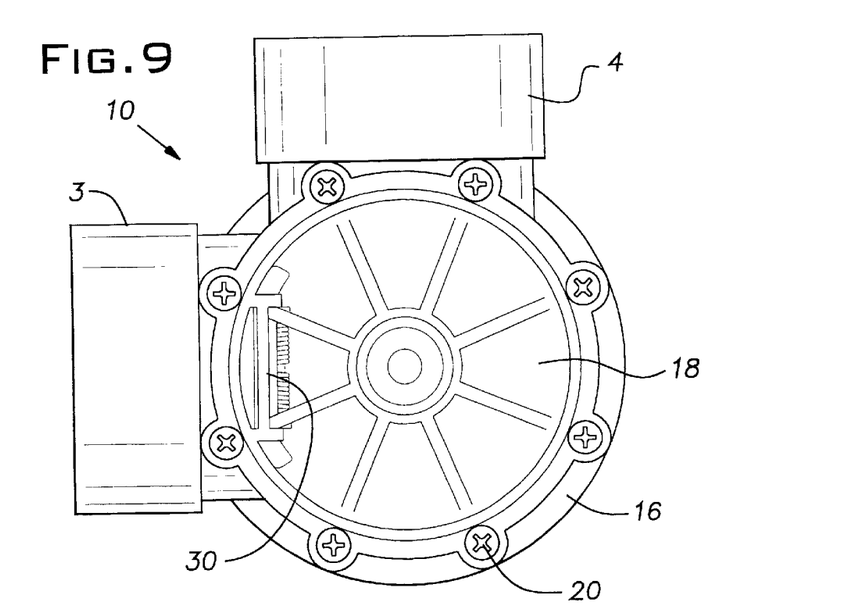
FIG. 9 is a top view of a check valve according to the invention in an "L" configuration.
Figure 10:
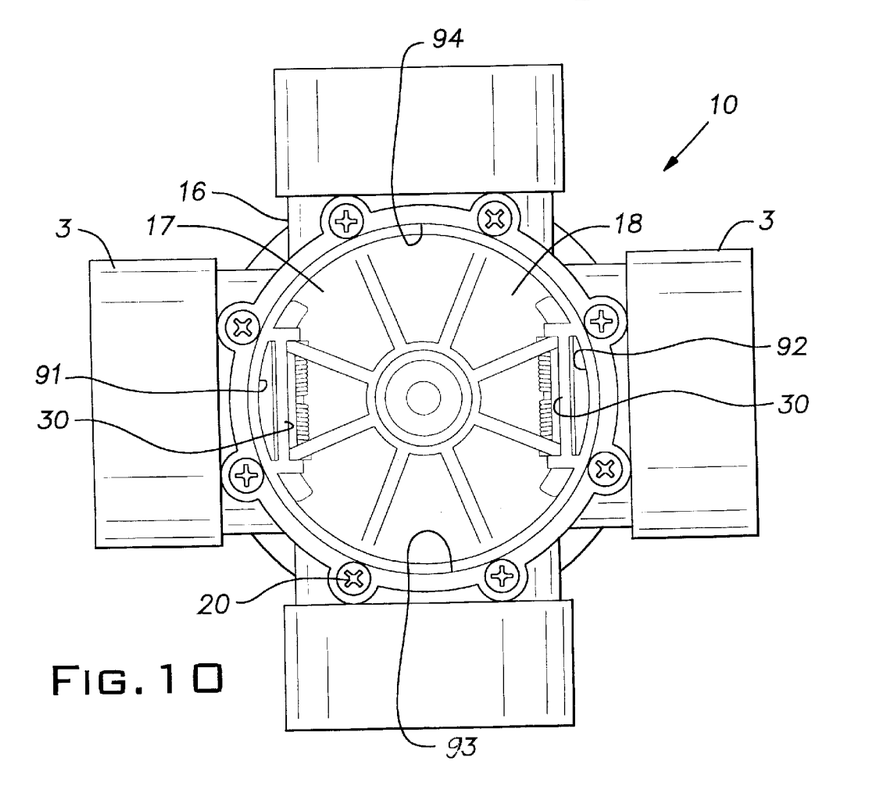
FIG. 10 is a top view of a check valve according to the invention in a cross-configuration.

FIGS. 9 and 10 show the invented check valve 10 provided in an "L" configuration and in a cross-configuration respectively. In FIG. 10, the valve is shown having two sealing assemblies 30. Thus, in FIG. 10 fluid is permitted to flow into the interior volume 17 through ports 91 and 92, and in or out from ports 93 and 94. But fluid is not permitted to flow from the interior volume 17 out through ports 91 and 92. Alternatively, the cross-configuration valve shown in FIG. 10 can be provided with 1 or 3 sealing assemblies 30 to suit a particular piping system.

Although the hereinabove described embodiments of the invention constitute the preferred embodiments, it should be understood that modifications can be made thereto without departing from the scope of the invention as set forth in the appended claims.

What is claimed is:

1. A check valve comprising a valve body, a sealing assembly provided within said valve body and at least one wall pivot joint between said sealing assembly and said valve body, said valve body having an inner wall surface, an inlet port, an outlet port and a valve seat adjacent said inlet port, said sealing assembly comprising an armature having a proximal end and a distal end, a sealing member and a seal pivot joint, said sealing member being pivotally attached to said distal end of said armature at said seal pivot joint, said proximal end of said armature being pivotally attached to said inner wall surface of said valve body at said wall pivot joint, said sealing member being biased, via a biasing force, in a seated position against said valve seat, wherein said sealing member is Pivotable relative to said armature about said pivot joint but not translatable relative to said armature.

2. A check valve according to claim 1, said sealing member being translatable along an arcuate path that is substantially aligned with said valve seat, said sealing member being rotatable about a first rotational axis, said first rotational axis being substantially parallel to an axis of rotation of said armature about said wall pivot joint.

3. A check valve according to claim 2, said sealing member being further rotatable about a second rotational axis, said second rotational axis being substantially perpendicular to said first rotational axis.

4. A check valve according to claim 1, said sealing member being translatable along an arcuate path that is substantially aligned with said valve seat, said sealing member being rotatable about a rotational axis, said rotational axis being substantially perpendicular to an axis of rotation of said armature about said wall pivot joint.

5. A check valve according to claim 1, said sealing member having at least one degree of rotational freedom about said seal pivot joint.

6. A check valve according to claim 1, said sealing member having at least two degrees of rotational freedom about said seal pivot joint.

7. A check valve according to claim 1, said sealing member having substantially infinite degrees of rotational freedom about said seal pivot joint.

8. A check valve according to claim 1, said sealing member comprising a rigid support member and a resilient elastomeric sheath, said rigid support member having a facing surface and a rear surface, said rigid support member having a surface contour that is complementary to a contour of said valve seat, said resilient elastomeric sheath being provided on said facing surface of said rigid support member at least as an annular ring complementary to said valve seat.

9. A check valve according to claim 8, wherein said elastomeric sheath covers said facing surface of said rigid support member.

10. A check valve-according to claim 8, wherein said elastomeric sheath wraps around an edge of said rigid support member and covers at least a portion of said rear surface thereof.

11. A check valve according to claim 8, wherein said elastomeric sheath is molded over said rigid support member such that said elastomeric sheath substantially encloses said rigid support member therein.

12. A check valve according to claim 11, said rigid support member having a plurality of plug holes, said elastomeric sheath having elastomeric plugs in said plug holes, said elastomeric plugs fixing said elastomeric sheath in place over said rigid support member.

13. A check valve according to claim 8, said seal pivot joint being located proximate the center of said rear surface of said rigid support member.

14. A check valve according to claim 1, further comprising a cover member removably attachable to said valve body, said cover member having an inner wall surface thereof, said proximal end of said armature being pivotally attached to said inner wall surface of said cover member, said wall pivot joint being located at a point adjacent said inner wall surface of said cover member.

15. A check valve according to claim 14, said cover member having a plurality of first holes therein, said valve body having a plurality of second holes therein, said first holes being adapted to line up with said second holes in said valve body, said cover member being secured to said valve body via fasteners through said first and said second holes.

16. A check valve according to claim 15, said first and said second holes being provided such that said cover member is attachable to said valve body in a plurality of rotational positions relative to said valve body.

17. A check valve according to claim 14, said cover member being attachable to said valve body in a plurality rotational positions relative to said valve body.

18. A check valve according to claim 17, said cover member being attachable to said valve body in at least two rotational positions such that said sealing assembly is thereby correspondingly positionable adjacent a respective port in said valve body relative to each of said rotational positions, wherein said port adjacent to which said sealing assembly is positioned is thereby made an inlet port.

19. A check valve according to claim 14, said cover member being substantially transparent.

20. A check valve according to claim 1, said inlet and said outlet ports being substantially coaxially aligned.

21. A check valve according to claim 1, said inlet and said outlet ports being axially offset at an angle.

22. A check valve according to claim 1, further comprising a torsion spring, said torsion spring providing said biasing force.

23. A check valve according to claim 14, further comprising an O-ring effective to facilitate a fluid-tight seal between said valve body and said cover member.

24. A check valve according to claim 1, said valve seat surrounding said inlet port.

25. A check valve comprising a valve body, a sealing assembly provided within said valve body and at least one wall pivot joint between said sealing assembly and said valve body, said valve body having an inner wall surface, an inlet port, an outlet port and a valve seat adjacent said inlet port, said sealing assembly comprising an armature having a proximal end and a distal end, a sealing member and a seal pivot joint, said sealing member being pivotally attached to said distal end of said armature at said seal pivot joint, said proximal end of said armature being pivotally attached to said inner wall surface of said valve body at said wall pivot joint, said sealing member being biased, via a biasing force, in a seated position against said valve seat, said check valve having at least three ports.

26. A check valve according to claim 25, said check valve having at least two sealing assemblies, each said sealing assembly being provided adjacent a respective port.

27. A check valve comprising a valve body, a sealing assembly provided within said valve body and at least one wall pivot joint between said sealing assembly and said valve body, said valve body having an inner wall surface, an inlet port, an outlet port and a valve seat adjacent said inlet port, said sealing assembly comprising an armature having a proximal end and a distal end, a sealing member and a seal pivot joint, said sealing member being pivotally attached to said distal end of said armature at said seal pivot joint, said proximal end of said armature being pivotally attached to said inner wall surface of said valve body at said wall pivot joint, said sealing member being biased, via a biasing force, in a seated position against said valve seat, said armature having, at said proximal end, a first extending portion and a second extending portion, each of said first and second extending portions having a first pin-receiving bore therein, said valve body further comprising a plurality of pivot support arms cantilevered from said inner wall surface of said valve body, said pivot support arms each having a second pin-receiving bore therein corresponding to, and aligned with, said first pin-receiving bores in said first and second extending portions respectively, a first pin being retained in said aligned first and second pin-receiving bores associated with said first extending portion of said armature to provide said at least one wall pivot joint, and a second pin being retained in said aligned first and second pin-receiving bores associated with said second extending portion of said armature to provide an additional wall pivot joint, said check valve thereby comprising two wall pivot joints.

28. A check valve comprising a valve body, a sealing assembly provided within said valve body and at least one wall pivot joint, said valve body having an inner wall surface, an inlet port, an outlet port and a valve seat adjacent said inlet port, said sealing assembly comprising an armature having a proximal end and a distal end, a sealing member and a seal pivot joint, said sealing member being pivotally attached to said distal end of said armature at said seal pivot joint, said sealing member being rotatable about a first rotational axis drawn substantially through said seal pivot joint, said proximal end of said armature being pivotally attached to said inner wall surface of said valve body at said wall pivot joint such that said sealing member is translatable along an arcuate path that is substantially aligned with said valve seat, said sealing member being biased, via a biasing force, in a seated position against said valve seat, wherein said sealing member is pivotable relative to said armature about said pivot joint but not translatable relative to said armature.

29. A check valve according to claim 28, said sealing member comprising a rigid support member and a resilient elastomeric sheath, said rigid support member having a facing surface and a rear surface, said rigid support member having a surface contour that is complementary to a contour of said valve seat, said resilient elastomeric sheath being provided on said facing surface of said rigid support member at least as an annular ring complementary to said valve seat.

30. A check valve according to claim 28, further comprising a cover member removably attachable to said valve body, said cover member having an inner wall surface thereof, said proximal end of said armature being pivotally attached to said inner wall surface of said cover member, said wall pivot joint being located at a point adjacent said inner wall surface of said cover member.

31. A check valve according to claim 30, said cover member being attachable to said valve body in at least two rotational positions such that said sealing assembly is thereby correspondingly positionable adjacent a respective port in said valve body relative to each of said rotational positions, wherein said port adjacent to which said sealing assembly is positioned is thereby made an inlet port.

32. A check valve according to claim 30, said cover member being substantially transparent such that said sealing assembly is visible from outside said valve body through said cover member.

33. A valve comprising:
   a housing defining an interior volume and having at least two flow ports therethrough; and
   a cover having a sealing assembly pivotally attached thereto, said cover being removably attachable to said housing in a plurality of orientations to selectively orient said sealing assembly adjacent any one of said ports such that fluid is permitted to flow into said interior volume of said housing through said adjacent port and said sealing assembly prevents said fluid from flowing out of said interior volume through said adjacent port, wherein said sealing assembly comprises:
   an armature pivotally attached to said cover;
   a biasing member between said cover and said armature;
   a seal pivot joint; and
   a sealing member pivotally attached to said at said seal pivot joint, wherein said sealing member comprises at least one lip that extends around a perimeter of said sealing member and is supported thereby to contact said housing, and wherein said sealing member is pivotable relative to said armature about said pivot joint but not translatable relative to said armature.

34. A valve according to claim 33, said sealing member further comprising an outer lip that is parallel with said inner lip and cantilevered therefrom.

35. A valve according to claim 33, said sealing member comprising a resilient elastomeric sheath having a contour that is complementary to a contour of said valve seat.

36. A valve according to claim 33, said cover being a transparent cover.

37. A check valve comprising a valve body, a sealing assembly provided within said valve body and at least one wall pivot joint between said sealing assembly and said valve body, said valve body having an inner wall surface, an inlet port, an outlet port and a valve seat adjacent said inlet port, said sealing assembly comprising an armature having a proximal end and a distal end, a sealing member and a seal pivot joint, said sealing member being pivotally attached to said distal end of said armature at said seal pivot joint, said proximal end of said armature being pivotally attached to said inner wall surface of said valve body at said wall pivot joint, said sealing member being biased, via a biasing force, in a seated position against said valve seat, wherein said sealing member is pivotable relative to said armature about only a single rotational axis.

38. A check valve according to claim 37, said sealing member being translatable along an arcuate path that is substantially aligned with said valve seat, said rotational axis being substantially parallel to an axis of rotation of said armature about said wall pivot joint.

39. A check valve according to claim 37, said sealing member comprising a rigid support member and a resilient elastomeric sheath, said rigid support member having a facing surface and a rear surface, said rigid support member having a surface contour that is complementary to a contour of said valve seat, said resilient elastomeric sheath being provided on said facing surface of said rigid support member at least as an annular ring complementary to said valve seat.

40. A check valve according to claim 37, wherein said elastomeric sheath is molded over said rigid support member, said rigid support member having a plurality of plug holes, said elastomeric sheath having elastomeric plugs in said plug holes, said elastomeric plugs fixing said elastomeric sheath in place over said rigid support member.

* * * * *